April 10, 1934. N. TRBOJEVICH 1,954,504
METHOD OF PRODUCING GEARS
Filed Feb. 21, 1931   3 Sheets-Sheet 1
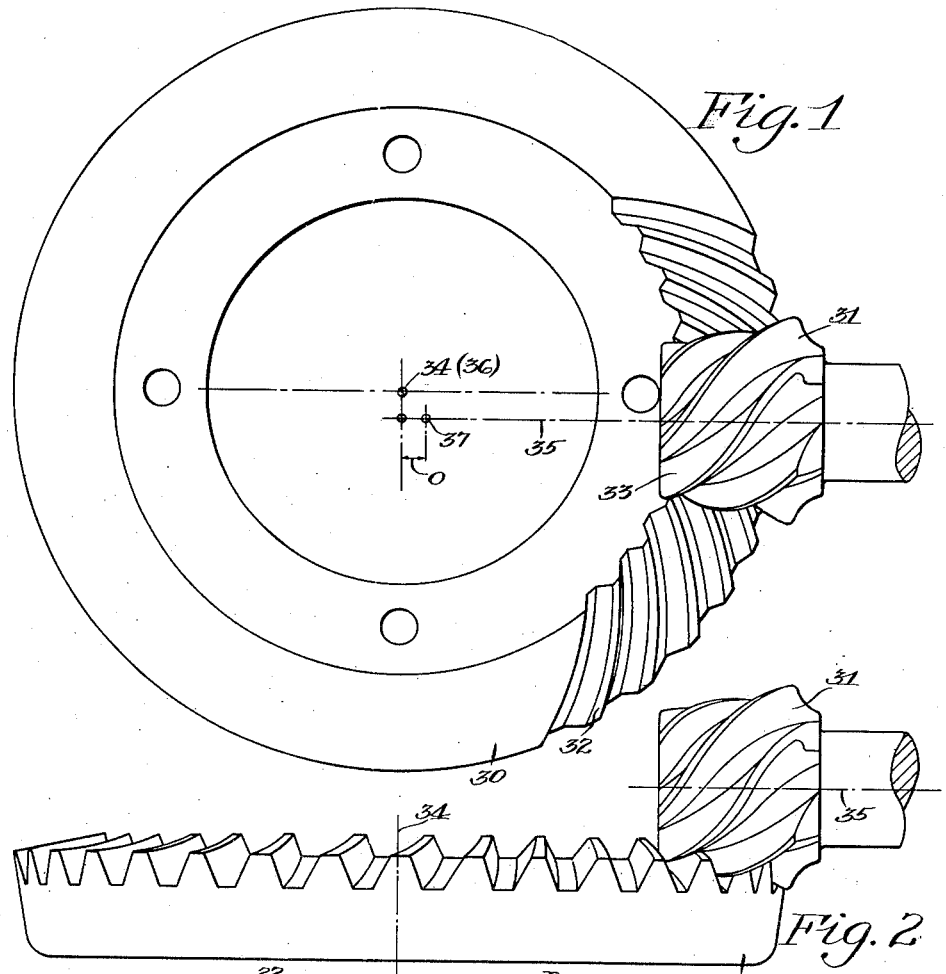
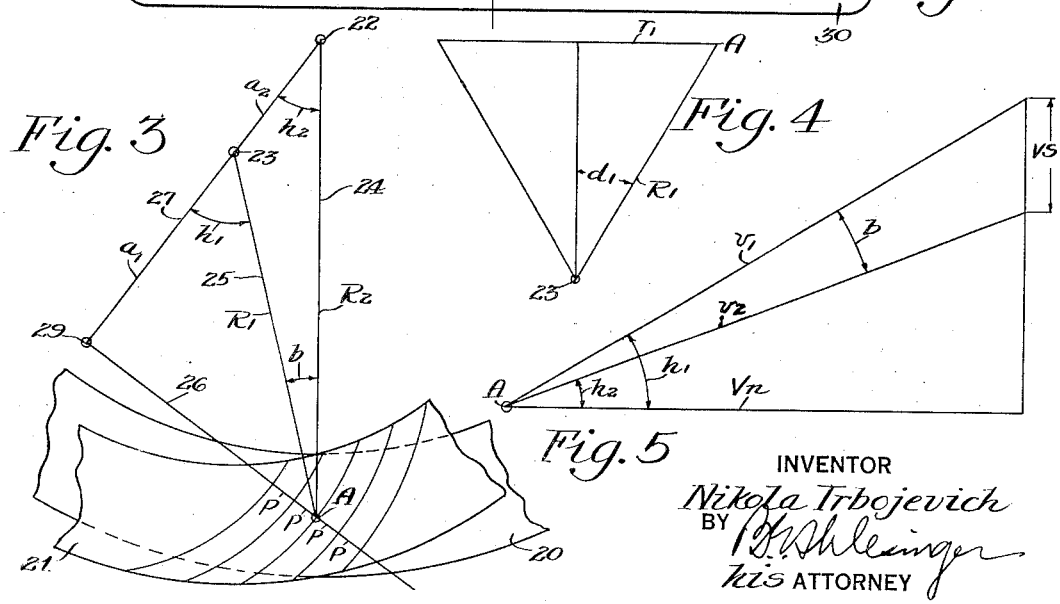
INVENTOR
Nikola Trbojevich
BY
his ATTORNEY April 10, 1934.    N. TRBOJEVICH    1,954,504
METHOD OF PRODUCING GEARS
Filed Feb. 21, 1931    3 Sheets-Sheet 2

INVENTOR
Nikola Trbojevich
BY
his ATTORNEY

April 10, 1934.  N. TRBOJEVICH  1,954,504
METHOD OF PRODUCING GEARS
Filed Feb. 21, 1931   3 Sheets-Sheet 3
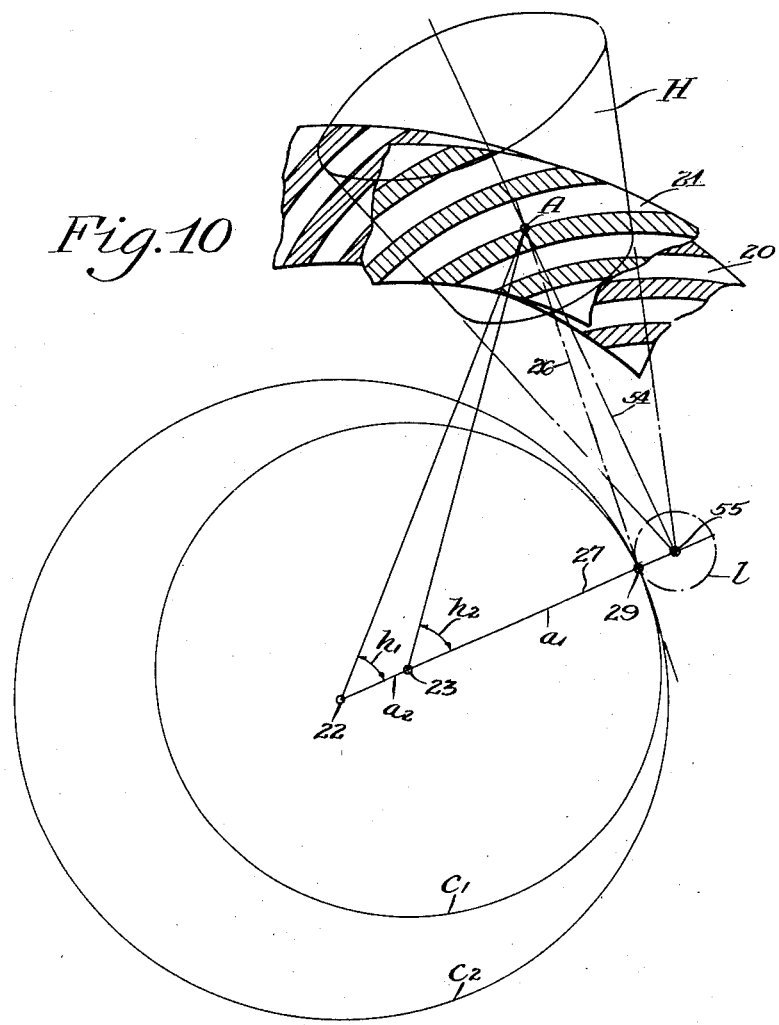
Fig.10
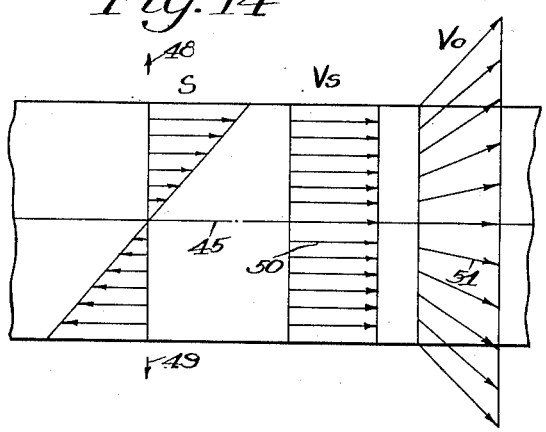
Fig.14
Fig.13
INVENTOR
Nikola Trbojevich
BY
his ATTORNEY Patented Apr. 10, 1934

1,954,504

UNITED STATES PATENT OFFICE 1,954,504

METHOD OF PRODUCING GEARS

Nikola Trbojevich, Detroit, Mich., assignor to Gleason Works, Rochester, N. Y., a corporation of New York Application February 21, 1931, Serial No. 517,484

10 Claims. (Cl. 90—4)

The present invention relates to longitudinally curved tooth tapered gears and to the cutting of the same particularly in a hobbing operation.

One object of the present invention is to construct spiral bevel gears whose tooth surfaces mesh with a sliding engagement so that as the gears run together in mesh, a film of the oil used for lubricating the gears will be spread over the whole of the contacting portions of the tooth surfaces and maintained, thereby prolonging the life of the gears and giving increased resistance to wear.

Another object of this invention is to produce hobbed spiral bevel gears which will be less sensitive to shaft mis-alignment, mounting errors, and changes of load in use than spiral bevel gears as hobbed by processes heretofore known.

Spiral bevel gears are ordinarily made to mesh with their axes intersecting. Consequently the tooth surfaces of mating gears have a true rolling engagement. This rolling engagement is theoretically correct but there exists the danger that under heavy loads the oil film between the contacting tooth surfaces may be broken at the pitch line and the gears be pitted or scored. This danger is present because at the pitch line, the gears mesh with pure rolling contact.

Hobbed spiral bevel gears, moreover, as heretofore hobbed, have lacked adjustment in mesh. The teeth of gear and pinion have had the same lengthwise tooth curvature so that the pair have had to be mounted with extreme accuracy and rigidity to insure against failure in use. In their lack of adjustment, hobbed spiral bevel gears have compared unfavorably with spiral bevel gears cut by other cutting methods, for from a practical standpoint, adjustment is required in spiral bevel gears in order to allow them to accommodate themselves to the variations in mounting conditions and loads which are bound to be encountered in use.

I have discovered that if spiral bevel gears are cut so that they must run in offset position a certain percentage of longitudinal sliding is introduced between the mating tooth surfaces during engagement and the possibility of rupture of the oil film at the pitch line will be avoided and the gears will have increased life. With the present invention it is proposed, therefore, to cut spiral bevel gears so that they will run in offset position, that is, with their axes non-intersecting and non-parallel.

I have discovered further that by hobbing a pair of spiral bevel gears so that their teeth have different spiral angles, the mating tooth surfaces will bear or contact along a part of their length only and, like spiral bevel gears cut according to other than hobbing methods, will have the adjustment required in normal use. Incidentally since the hobbed gears have different spiral angles they will run together in offset position, so that gears hobbed according to the present invention will have not only a localized bearing but sufficient sliding will be introduced between their contacting tooth surfaces to maintain the oil film even under the severest loads.

Further advantages of this invention are that the pinion can be made larger, for the same ratio and ring gear diameter, than in conventional spiral bevel gear design; that the drive will have a greater efficiency at high speeds and heavy loadings; and that by replacing the former line contact between mating tooth surfaces with a point contact of a very large radius of relative curvature, a desirable manufacturing tolerance will be possible in the machining of the gear teeth.

My invention is particularly applicable to longitudinally curved tooth gearing of the modified involute type such as described in my patents, Reissue Nos. 16,173 and 16,371, reissued September 22, 1925 and June 29, 1926, respectively, and my present invention may be regarded as an improvement upon the invention of those patents.

In the drawings:

Figures 1 and 2 are a plan view and a side elevation, respectively, of a pair of longitudinally curved tooth tapered gears cut according to the present invention;

Figure 3 is a diagrammatic view showing the developments in the common tangent plane of the mating gear and pinion;

Figure 4 is a section on the line 25 of Figure 3;

Figure 5 is a velocity diagram based on Figure 3;

Figure 10 is a diagrammatic view taken in the common tangent plane and further illustrative of the principles upon which mating gears can be hobbed according to the present invention;

Figure 13 is a diagrammatic view showing the way in which the oil film is distributed in a pair of conventional spiral bevel gears; and Figure 14 is a diagrammatic view explaining the compounding of cross-wise and longitudinal rubbing velocities in gears cut according to the present invention and illustrating how the oil film is distributed as a result.

Figure 6:
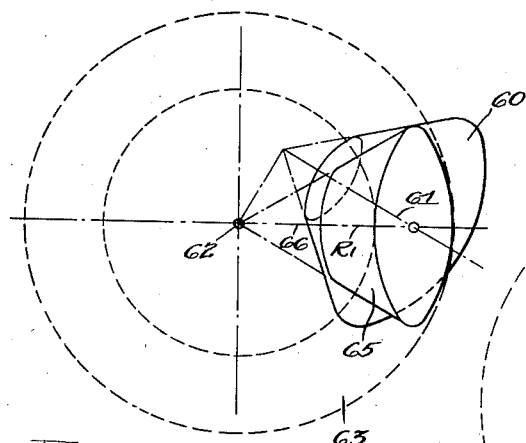
Figures 6 and 7 are a plan view and a side elevation, respectively, illustrating diagrammatically the hobbing of a pinion according to this invention.
Figure 8:
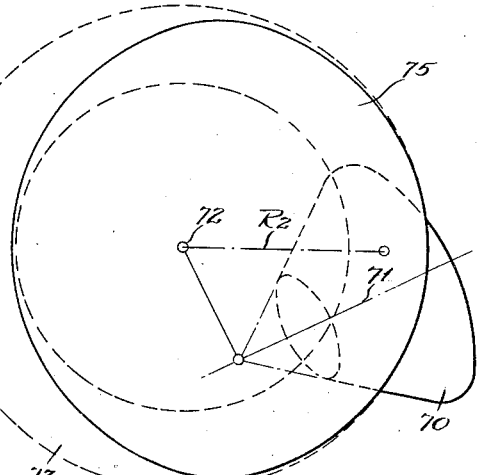
Figures 8 and 9 are corresponding diagrammatic views illustrating, in plan and side elevation, the hobbing of the mating gear.

As indicated above, it is the purpose of the present invention to produce spiral bevel gears which will run together in offset position, that is, with their axes angularly disposed and non-intersecting, in order to introduce a certain percentage of lengthwise sliding between their mating tooth surfaces and in order to obtain a suitable localization of tooth contact or bearing. We shall first determine the conditions required in order that a pair of spiral bevel gears run together properly in mesh in offset position and then we shall determine the conditions requisite for the hobbing of such gears.

Inasmuch as this invention is of a predominantly mathematical nature, it will be necessary to resort in this description to certain mathematical symbols and equations hereinafter given. I shall denote with indices 1 the quantities pertaining to the pinion with indices 2 the quantities pertaining to the gear and with capital letters (with or without corresponding indices) the quantities pertaining to developments in the common tangent plane.

Figure 3 shows the developments into a common plane, tangent to their pitch surfaces, of two mating longitudinally curved tooth taper gears whose axes are disposed in offset relation that is non-intersecting and non-parallel. 20 designates the developed pitch surface of the gear and 21 the developed pitch surface of the pinion. The apex or center of the gear is at 22 while the apex or center of the pinion is at 23. The pair are provided with longitudinally curved teeth. These teeth are in engagement at a mean point A approximately midway the length of face of the gear and pinion.

From Figure 3 we may write $$\cos h_1 = \frac{a_1}{R_1} \quad (1)$$

$$\cos h_2 = \frac{a_2}{R_2} \quad (2)$$

$$h_1 - h_2 = b \quad (3)$$

$$p = \frac{2a_1\pi}{N_1} = \frac{2a_2\pi}{N_2} \quad (4)$$

$$\frac{N_2}{N_1} = \frac{a_2}{a_1} = \frac{1}{Q'}, \quad (5)$$

where $h$ is the helix or spiral angle of the teeth, $a$ the base radius, $R$ the pitch cone radius, $b$ the offset angle in development, that is, the angle between the axis 24 of the gear and the axis 25 of the pinion, $p$ the normal pitch of the teeth of the gear and pinion, N the number of teeth in development, and $Q'$ the ratio of the pair in development.

In order that the gears 20 and 21 may mesh, it is necessary that the common normal 26 to the tooth curve of the pair at the mean contact point A intersect at right angles the line 27 connecting the apexes 22 and 23.

To determine the cone angles required for the mating gears, we write from Figure 4:

$$\sin d_1 = \frac{r_1}{R_1} \quad (6)$$

and by analogy $$\sin d_2 = \frac{r_2}{R_2} \quad (7)$$

where $d$ notes the pitch cone angle.

From the well known rules of analytic geometry, it may be deduced that in order that the axes of the gear and pinion be at right angles to each other, it is sufficient and necessary that $$\cos b = \tan d_1 \tan d_2 \quad (8)$$

that is, the pitch cone angles of the pair will be affected by the selection of the angle of offset or sliding $b$. In ordinary bevel gears, $b = 0$ and $d_1 + d_2 = 90°$ but in my improved gearing, the angle $b$ will range from 5 to about 25° and the sum of the two pitch cone angles $d_1$ and $d_2$ will be slightly less than 90° where the angle between the axes of the gear and the pinion is to be 90°.

To utilize the formulas 1 to 8 for the actual design of the improved gearing, we introduce the pitch cone radii $r$ and the numbers of teeth $n$ of the mating gears. The normal pitch $p$ must necessarily be the same for both gears. Hence the circular pitches $p'$ will be different for the two gears because the helix or spiral angles are different. In particular, $$p'_1 = \frac{p}{\cos h_1} \quad (9)$$

$$p'_2 = \frac{p}{\cos h_2} \quad (10)$$

but $$p'_1 = \frac{2r_1\pi}{n_1} = \frac{2R_1\pi}{N_1} \quad (11)$$

and similarly for $p'_2$. Hence it follows that:

$$\frac{r_1 \cos h_1}{n_1} = \frac{r_2 \cos h_2}{n_2} \quad (12)$$

This gives the needed relation that exists between the pitch cone radii and the numbers of teeth.

Certain research works, for example, that of Illmer, show that the oil film between the mating tooth surfaces will be broken whenever the rubbing or sliding velocity between the contacting tooth surfaces is less than about 100 feet per minute. This applies in the case of only very light loading or no loading at all and for higher tooth loads, a proportionately higher rubbing or sliding velocity is required to maintain the oil film. Our next step is to determine, as a function of the angle $b$, the variation of the rubbing velocity longitudinally of the mating teeth in a pair of longitudinally curved tooth tapered gears which mesh in offset position.

The rubbing velocity $V_s$ will be the same in development as in the actual gears. This follows from the fact that each gear of the mating pair rolls without sliding with its own plane development whence the relative velocity of the developments 20 and 21 in the common tangent plane must be exactly the same as the rubbing velocities in the mating gears.

If we let $V_n$ be the normal rolling velocity, the same for both gears $v_1$ and $v_2$ the two corresponding tangential velocities, then from Figure 5 it follows that:

$$V_n = v_1 \cos h_1 = v_2 \cos h_2 \quad (13)$$

and the rubbing velocity will be $$V_s = v_1 \sin h_1 = v_2 \sin h_2 \quad (14)$$

comparing Figure 5 with Figure 3, we see that the rubbing velocity $V_s$ is proportional to the apex distance 22—23 of the system, an important rule in the theory underlying this invention. In the same diagram (Fig. 3) the length of the common normal 26 is proportional to the normal or rolling velocity of the system, from the similarity of the triangles in Figures 3 and 5.

Thus in designing gears according to my invention, I first select the two spiral angles of the teeth ($h_1$ and $h_2$), keeping in mind that their difference $b$ will determine the rubbing velocity necessary to maintain the oil film between the contacting tooth surfaces. Then by following Equations 1 to 14, I determine exactly all the dimensions required. It will be noted that the pitch cone radii $R_1$ and $R_2$, respectively, of gear and pinion, unlike ordinary spiral bevel gears, are unequal. The pitch cone radius $R_1$ of the pinion being less than the pitch cone radius $R_2$ of the gear. It will be noted, also, that the spiral angle $h_1$ of the pinion teeth is larger than the spiral angle $h_2$ of the gear teeth.

It remains to determine the offset of the axes of the gear and pinion so that the gears may be correctly assembled after they are cut. There are three kinds of such offsets involved, one pertaining to the two axes and the other two to the two apexes.

In Figures 1 and 2 are shown a pair of gears cut according to this invention. 30 designates the gear and 31 the pinion. The gear has longitudinally curved teeth 32 which are of opposite hand and of smaller spiral angle than the longitudinally curved teeth 33 of the mating pinion. 34 designates the axis of the gear and 35 the axis of the pinion. 36 is the gear apex and 37 the pinion apex.

The offset $f$ of the pinion axis 35 from the gear axis 34 may be calculated from Equations 1 to 14 and its exact value is $$f = \sin b (r_1 \cos d_2 + r_2 \cos d_1) \quad (15)$$

The overlap O of the pinion apex relative to that of the gear apex is always negative in this system, that is, the pinion apex 37 will always lie within a line drawn from the gear apex 36 perpendicular to the pinion axis 35. The value of the overlap of the pinion apex is:

$$O = \cos d_2 (R_2 - R_1 \cos b) \quad (16)$$

Figure 11:
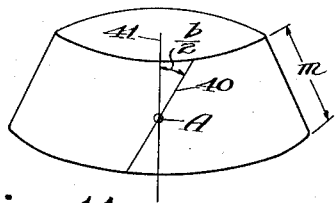
Figures 11 and 12 are diagrammatic views explaining the location of the hyperbola along which the localized tooth bearing is calculated and showing the effects of this bearing, respectively.
Figure 12:
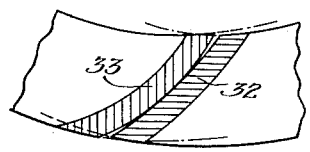

The new gears mesh with a point contact or localized bearing, as already stated. The difference in curvature between the teeth of the gear and pinion is very slight, however, and under a load, this point contact will spread out into an area of contact, varying from instant to instant. In Figure 11, the mean point of contact A is at the middle of the gear face whose width is $m$ and the line 40 which is at an angle $$\frac{b}{2}$$

to the pitch cone generatrix 41 is a hyperbola along which the distance separating the mating tooth surfaces is the least. The nature of the contact between the mating teeth 32 and 33 is shown in Figure 12. It will be seen that due to the different spiral angles of the gear and pinion, the teeth 33 of the pinion contact with the teeth 32 of the gear at the center of the face only.

I have calculated the heights of the arcs of mating tooth surfaces for a pitch cone radius of 5 inches, 5 to 1 ratio, 1½ inch face width and have found that the mating tooth surfaces come to within .0008″ of one another for an offset angle $b = 5°$, to within .0033″ for an offset angle $b = 10°$, and to within .0077″ for an offset angle $b = 16°$. This shows that the localization of tooth bearing can be very delicately pre-selected and pre-determined.

The new gears in action differ from conventional spiral bevel gears in that the mating tooth surfaces slide longitudinally relatively to each other. They also slide crosswise, that is, radially of the teeth in substantially the same way as do the tooth surfaces of conventional spiral bevel gears.

Figure 13 shows the condition which prevails when a pair of gears have only a rolling engagement, as is the case in a pair of conventional spiral bevel gears. At the pitch line 45, there will be no sliding motion but only pure rolling motion between the two contacting tooth surfaces. Above and below the pitch line, however, there will be cross-wise sliding and this crosswise sliding S will be at a maximum at the tips and the roots of the teeth. Since only crosswise sliding is present, the area between the lines 46 and 47 will constitute a danger zone within which the mating tooth surfaces will rub but with so small a rubbing velocity that under a given load, the oil film may be ruptured with the consequence that in this area the gears may run dry and the tooth surfaces become pitted.

In the new gears, due to the offset of the axes of the pair, a longitudinal sliding $V_s$ is introduced which is additional to the crosswise sliding S and which combines with that crosswise sliding. It is to be noted that the two slidings S and $V_s$ are at right angles to each other, that is the crosswise sliding S is in the direction of the arrows 48 and 49 while the longitudinal sliding $V_s$ in the direction of the arrows 50. The total sliding $V_0$ in a pair of gears constructed according to this invention will be the geometrical sum of the slidings S and $V_s$. At the right hand side of the diagram in Figure 14, the result of compounding the two slidings is shown. The resulting total sliding is in the form of a fan-shaped array of velocities $V_0$. It will be seen that, if the offset of the axes of the pair is sufficient, the longitudinal sliding $V_s$ will maintain the oil film itself and the cross sliding S will be at no time negative the sliding $V_s$ but will actually promote the effectiveness of the sliding motion introduced, especially so at the roots and at the tops of the teeth. In a pair of gears constructed according to this invention, therefore, the oil film will stream in the direction of the arrows 51 across the whole of the mating tooth surfaces. The oil film will no longer be subjected to the oppositely directed (tensile) forces as is the case in conventional spiral bevel gearing (Fig. 14). Hence the oil film will be spread over the whole of the contacting tooth surfaces and maintained.

In order to cut the new gearing by means of taper hobs according to the principles laid down in my prior patents above mentioned, the radius of the base circle from which the lengthwise tooth curvature of the pinion teeth is derived is made equal to the distance 23—29 (Figures 3 and 10) while the radius of the base circle from which the lengthwise tooth curvature of the gear teeth is derived is made equal to the distance 22—29. Thus the base circle $c_1$ from which the longitudinal curvature of the teeth of the pinion is derived will be smaller than the base circle $c_2$ from which the longitudinal curvature of the teeth of the gear is derived. This differs from my previous inventions, for according to the method of my previous patents, the base circles of the gear and pinion were of identical diameter. As before, however, the mating gears will be cut with hobs of exactly the same characteristics and dimensions, except that one hob is right handed and the other left handed, and as before, the apexes of the hobs will be located on the line 27 perpendicular to the axes 54 of the hobs and passing through the apexes 22 (23) of gear and pinion, while the base circles $l$ of the hobs will be tangent to the base circles $c_2$ ($c_1$) of gear and pinion at the point of intersection of the normals to the tooth curves of gear and pinion. Thus, the apex 55 of the pitch cone of either hob H will be located on the line connecting the apexes 22 and 23 of the gear and pinion and the distance 29—50 will equal the polar subnormal of the hob. Thus, also the base circles $l$ of the hobs H in development will be tangent to the base circles $c_2$ and $c_1$ of the gear and pinion, respectively, at the point 29, which is the point of intersection of the normals 26 to the tooth curves of the gear and pinion. Except for the difference in diameter of the base circles of the gear and pinion, the method of hobbing gears according to the preferred embodiment of this invention is the same as the method disclosed in Patent No. 16,173 above referred to. As before, the teeth of gear and pinion will be of constant pitch along lines offset from their axes and of modified involute lengthwise curvature.

Figure 7:
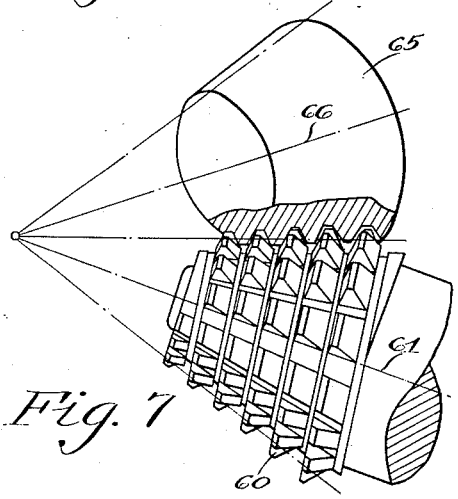
Figure 9:
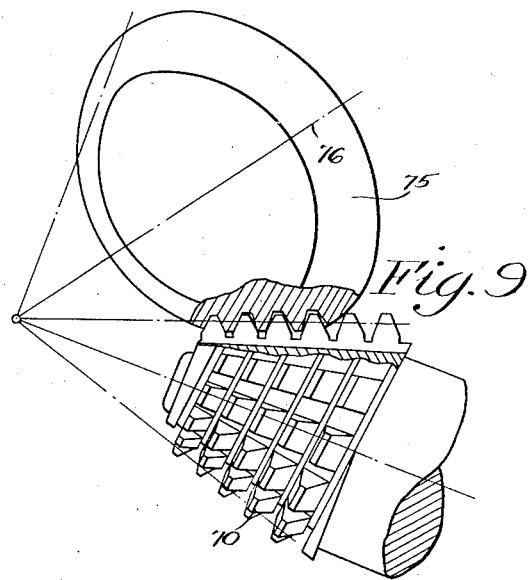

Figures 6 and 7 illustrate the cutting of a pinion according to this invention. The hob 60 is positioned with its axis 61 offset from the axis 62 of the imaginary crown gear 63 to which the pinion is to be generated conjugate by the radius of the base circle $c_1$ and the polar subnormal of the hob. The pinion blank 65 is positioned with its axis 66 intersecting the axis of the imaginary crown gear the same way as spiral bevel gears are ordinarily hobbed. To cut the pinion, the hob is rotated on its axis 61 and the blank is rotated on its axis 66 continuously in timed relation with the rotation of the hob and simultaneously a continuous relative rolling movement is produced between the hob and blank about the axis 62 of the crown gear or other imaginary basic gear to which the pinion is to be generated conjugate.

In cutting the mating gear 75, a hob 70 of the same dimension as the hob 60 but of opposite hand is employed. This hob 70 is positioned with its axis 71 offset from the axis 72 of the basic gear 73 to which the gear 75 is to be generated conjugate by a distance determined by the radius of the base circle $c_2$ and the polar subnormal of the hob. The blank 75 is positioned, as before, with its axis 76 intersecting the axis 72 of the imaginary generating gear. To cut the gear blank 75, the hob and blank are rotated on their respective axes 71 and 76 in timed relation and simultaneously a relative rolling movement is produced between the hob and blank about the axis of the imaginary generating gear 73.

By generating the gear and pinion from two different base circles, one larger and one smaller, the localized tooth bearing is obtained. The bearing is heaviest at the middle of the teeth, both on the convex and concave sides of the teeth, but fades out gradually or disappears toward the end of the gear teeth. I obtain this desirable localization of tooth bearing, moreover, without in any way sacrificing or modifying the correct kinematic principles upon which the taper hobbing process is based. Not only is a more desirable form of gearing produced, but due to the localization of mesh, also, the hobbing process itself is simplified in practise, as the hobs, machines, etc. do not have to be as exact as was formerly required.

While I have described the invention in connection with the hobbing of spiral bevel gears, the invention is applicable in certain aspects, also, to other methods of cutting such gears. Moreover, while I have laid down certain rules for the cutting of gears according to my present invention, it will be understood that the methods ordinarily practised in gear cutting for modifying tooth profile contact, etc. may be applied in practising this invention, also. In general it may be said that this application is intended to cover any variations, uses, or adaptations of the invention following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. The method of cutting a pair of tapered gears which are to mesh with axes angularly disposed but non-intersecting which comprises cutting each member of the pair with a taper hob by relatively rotating the hob and gear blank in engagement in timed relation while relatively rolling the hob and blank about an axis which intersects the axis of the blank, the hobs used for cutting the two gears being of opposite hand and being arranged for cutting the two gears, respectively, so that their axes are offset different distances from the axes about which, respectively, the relative rolling movements take place.

2. The method of producing a pair of tapered gears which are to mesh with angularly disposed offset axes, which comprises cutting the tooth surfaces of each gear by operating a cutting tool in engagement with a gear blank while producing a relative rolling movement between the tool and blank about an axis intersecting the axis of the blank, the blanks for the two gears being disposed, respectively, during the rolling movements, at different pitch cone distances from the axes about which the relative rolling movements take place.

3. The method of producing a pair of tapered gears, which are to mesh with angularly disposed offset axes, which comprises cutting the tooth surfaces of each gear by operating a cutting tool in engagement with a tapered gear blank while producing a relative rolling movement between the tool and blank about an axis intersecting the axis of the blank, the cutting tools for cutting the two blanks being so disposed and moved during generation that the gears produced have, respectively, teeth of different spiral angles and the two blanks being disposed, respectively, at different distances, during generation of each gear, from the axes about which the relative rolling movements take place, respectively.

4. The method of producing one member of a pair of tapered gears which are to mesh with angularly disposed offset axes which comprises operating a cutting tool in engagement with a tapered gear blank to produce longitudinally curved teeth on the blank having a different spiral angle from the spiral angle of the teeth of a mate gear and simultaneously producing a relative rolling movement between the cutting tool and blank as though the blank were rolling with a basic gear whose axis intersects the axis of the blank and whose pitch cone distance is different from the pitch cone distance of the mate gear.

5. The method of producing a pair of tapered gears which are to mesh with angularly disposed offset axes which comprises cutting each gear by positioning a worm hob in engagement with a tapered gear blank with its axis disposed diagonally across the face of the blank and rotating the hob and blank continuously in engagement in timed relation while simultaneously producing a relative rolling movement between the hob and blank about an axis intersecting the axis of the blank, the hobs for cutting the two gears being so disposed relative to the blanks as to cut teeth of different hands and different spiral angles on the two gears.

6. The method of producing a pair of tapered gears which are to mesh with angularly disposed offset axes which comprises cutting each gear by positioning a taper hob of constant pitch in engagement with a tapered gear blank with its axis disposed diagonally across the face of the blank and rotating the hob and blank continuously in engagement in timed relation while simultaneously producing a relative rolling movement between the hob and blank about an axis intersecting the axis of the blank, the hobs for cutting the two gears being so disposed relative to the two blanks as to cut teeth of different hands and different spiral angles on the two gears.

7. The method of producing a pair of tapered gears which are to mesh with angularly disposed offset axes which comprises cutting each gear by positioning a taper hob of constant pitch in engagement with a tapered gear blank with its axis disposed diagonally across the face of the blank and rotating the hob and blank continuously in engagement in timed relation while simultaneously producing a relative rolling movement between the hob and blank about an axis intersecting the axis of the blank, the hobs for cutting the two gears being identical except that they are of opposite hand and being so disposed relative to the two blanks as to cut teeth of different hands and different spiral angles on the two gears.

8. The method of producing a pair of tapered gears which are to mesh with angularly disposed offset axes which comprises cutting each gear by positioning a hob in engagement with a tapered gear blank with its axis disposed diagonally across the face of the blank and rotating the hob and blank continuously in engagement in timed relation while simultaneously producing a relative rolling movement between the hob and blank about an axis intersecting the axis of the blank, the hobs for cutting the two gears being offset different amounts from the axes about which relative rolling movements take place and the blanks being disposed, respectively, at different pitch cone distances from the axes about which relative rolling movements take place during the cutting of the two gears.

9. The method of producing a pair of tapered gears which are to mesh with angularly disposed offset axes which comprises cutting each gear by positioning a taper hob of constant pitch in engagement with a tapered gear blank with its axis disposed diagonally across the face of the blank and rotating the hob and blank continuously in engagement in timed relation while simultaneously producing a relative rolling movement between the hob and blank about an axis intersecting the axis of the blank, the hobs for cutting the two gears being offset different amounts from the axes about which relative rolling movements take place and the blanks being disposed at different pitch cone distances from the axes about which relative rolling movements take place during the cutting of the two gears.

10. The method of producing a pair of tapered gears which are to mesh with angularly disposed offset axes which comprises cutting each gear by positioning a hob in engagement with a tapered gear blank with its axis disposed diagonally across the face of the blank and rotating the hob and blank continuously in engagement in timed relation while simultaneously producing a relative rolling movement between the hob and blank about an axis intersecting the axis of the blank, the hobs for cutting the two gears being identical except that they are of opposite hand but being offset different amounts from the axes about which relative rolling movements take place and the blanks being disposed at different pitch cone distances from said axes, during the cutting of the two members of the pair.

NIKOLA TRBOJEVICH.